Patented Aug. 1, 1939

2,168,011

UNITED STATES PATENT OFFICE 2,168,011

POLYMERIZATION OF 1,2-DIHYDRONAPHTHALENE AND POLYMER

Joseph Frederic Walker, Niagara Falls, N. Y., assignor to E. I. du Pont de Nemours & Company, Wilmington, Del., a corporation of Delaware No Drawing. Application January 4, 1938, Serial No. 183,338

5 Claims. (Cl. 260—670)

This invention relates to the preparation of hydrocarbon polymers and has for its object the preparation of a new and useful hydrocarbon polymer. An object of the invention also is a method for polymerizing 1, 2-dihydronaphthalene to produce dimers thereof. My invention also comprises a crystalline dimer of 1, 2-dihydronaphthalene which is a new composition of matter.

Various other objects of the invention include the production of dimers of 1, 2-dihydronaphthalene which are useful for plasticizers and softeners in conjunction with hydrocarbon polymers and other resinous materials, the production of novel heat exchange fluids and the production of products useful as starting materials or intermediates in chemical syntheses. Still other objects of the invention will be apparent from the following description of my invention.

Various hydrocarbons, including the isomeric dihydronaphthalenes, have been polymerized heretofore by various methods to produce polymeric products. For example, a method of polymerizing dihydronaphthalene is disclosed in U. S. P. 2,055,708 and co-pending patent application Serial No. 736,960, filed July 25, 1934, now issued as U. S. Patent 2,108,213, whereby dihydronaphthalene is reacted with a solution of the sodium addition compound of naphthalene. The polymers from this method, which include dimers and other polymers of 1, 2-dihydronaphthalene and 1, 4-dihydronaphthalene, are all amorphous, resinous, non-crystalline substances, some solid and some liquid at room temperature.

I have discovered that by treating 1, 2-dihydronaphthalene with sulfuric acid of 75 to 85% strength, the 1, 2-dihyronaphthalene is thereby polymerized to form a crystalline dimer which when purified melts at 51–52° C., together with a liquid dimer. I have found that the concentration of the sulfuric acid is an important factor in this preparation. If the acid strength is less than 75%, little or no reaction occurs. On the other hand, with acid strength above 85%, the desired crystalline product is not formed. For example, it has been previously shown (Berichte, vol. 54, pp. 606–607) that when dihydronaphthalene is reacted with concentrated sulfuric acid (94–96% strength) in benzene solution, the resulting product is a crystalline substance which melts at 93° C. and therefore is a different substance than the product of my invention, which melts at 51–52° C. when completely purified. Also when the acid strength is not over 85%, the reaction is less violent, less cooling is required and even at high temperatures up to 200° C., the formation of undesired by-products is lessened or avoided.

Preferably, I carry out the polymerization reaction at an acid strength close to about 80%, e. g. 78–82% of sulfuric acid. It should be understood that when I speak of the percentage strength of the sulfuric acid, I refer to an acid solution wherein either pure or concentrated sulfuric acid ($H_2SO_4$) is diluted with water. I do not refer to the actual concentration of $H_2SO_4$ in the reaction mixture, which of course would be much lower than 75–85%.

The sulfuric acid treatment of the present invention results in polymerization of the 1, 2-dihydronaphthalene to the dimeric stage of polymerization. So far as I have been able to determine, little or no higher polymers are obtained. The product invariably is a mixture of a liquid dimer and a solid, crystalline dimer. The properties of these two dimers are more fully discussed hereinafter.

Factors other than the strength of the sulfuric acid used are relatively unimportant and may be varied over wide ranges with satisfactory results. For example, the temperature at which the polymerization reaction occurs may vary from 20° C. to as high as 200° C. The only disadvantage of high temperatures is the production of a discolored product. I have found that if the reaction temperature is maintained not higher than 60° C. there is substantially no discoloration of the product and the resulting dimers will be substantially colorless. This discoloration appears to be the only disadvantageous effect of operating at temperatures above 60° C. The proportions of the sulfuric acid and the dihydronaphthalene in the reaction mixture also may be varied considerably. In general, as the concentration of the acid in the reaction mixture is increased, the time required for completion is correspondingly decreased. In general, I prefer to add 10 to 100 parts by weight of the sulfuric acid to each 100 parts of the 1,2-dihydronaphthalene. The reaction may be carried out by simply mixing the acid with the dihydronaphthalene and preferably the reaction mixture is continuously or intermittently stirred during the course of the reaction. If desired, a solvent for the dihydronaphthalene may be added, for example, a hydrocarbon, chlorinated hydrocarbon, or the like. I prefer not to use aromatic or other unsaturated compounds as solvents, as these tend to react in the presence of sulfuric acid. In general, however, I prefer to operate without the addition of any solvent.

After the reaction has been completed, the products may be recovered by conventional procedure. For example, the sulfuric acid may be separated and/or neutralized with an alkali and the reaction mixture then distilled to dissolve off unpolymerized dihydronaphthalene. On standing, the crude, separated product partially crystallizes and the crystalline dimer may be separated from the liquid dimer by known methods of filtering and washing or crystallizing with a suitable solvent, for example, light petroleum fractions or other hydrocarbon solvents.

In a specific preferred procedure in accordance with my invention 9 parts of 1,2-dihydronaphthalene are mixed with 1 part of 80% sulfuric acid, adding the dihydronaphthalene to the acid with stirring. By suitable cooling the temperature is maintained at between 35 and 40° C. while the stirring is continued for a period of about five hours. The temperature is then raised to 60–70° C., whereupon the stirring is stopped. On standing, the sulfuric acid solution readily separates out and then is drawn off from the reaction vessel. Sufficient solid sodium carbonate then is added and the mixture stirred, to neutralize the remaining acid. The mixture then is distilled at a reduced pressure of 15 mm. of mercury and the fraction boiling at 235 to 250° C. is collected. The distillate collected is cooled and allowed to stand until crystallization occurs. The crystals are then filtered from the liquid product and washed with petroleum ether. The resulting crude crystal product usually melts within the range: 40 to 55° C. This crystalline product may be purified by recrystallizing several times in petroleum ether or ethyl acetate, or both, whereby a crystalline product melting at 51 to 52° C. is obtained. This purified crystalline dimer of 1,2-dihydronaphthalene was found to be a dimer of 1,2-dihydronaphthalene having the empirical formula: $C_{20}H_{20}$. In order to determine the true melting point of the pure crystalline dimer made by my method, a crude product, which melted at 50–53° C., was purified by successive recrystallizations until a constant melting point was observed. The following data was thus obtained:

| Recrystallization | Recrystallization solvent | Melting point of recrystallized product |
|---|---|---|
| | | ° C. |
| First | Petroleum ether | 49 –51 |
| Second | Ethyl acetate | 50 –53 |
| Third | Petroleum ether | 51 –53 |
| Fourth | Ethyl acetate | 51.5–52.5 |
| Fifth | Petroleum ether | 51 –52 |

The crystalline dimer of 1,2-dihydronaphthalene, which when purified melts at 51–52° C., was found to have a boiling point of about 210 to 220° C. at a pressure of 1 to 5 mm. of mercury. This crystalline dimer is completely soluble in all proportions in substantially all hydrocarbon solvents. It is compatible with solid hydrocarbons and other hydrocarbon polymers in all proportions and when incorporated in such materials, it loses its crystalline nature, indicating the formation of a true solution. It is also soluble in the common ester solvents, i. e., the low molecular weight fatty acid esters, e. g., the ethyl and methyl acetates, butyrates and the like. The crystalline dimer has a high degree of thermal stability and may be heated to high temperatures at atmospheric pressure without decomposition. For example, it may be heated up to around 400° C. for considerable periods of time in the absence of air without undergoing appreciable decomposition or other change.

The liquid product, which is separated from the crystalline material, may be purified by redistillation. The liquid product likewise was found to be a dimer of dihydronaphthalene. The liquid dimer likewise is soluble in various hydrocarbon materials and also exhibits a high degree of thermal stability.

The products of my invention are excellently well adapted as heat exchange liquids for use at high temperatures because of their high boiling points and excellent stability at high temperatures. They are also useful as components of artificial resins and other plastic compositions, the main ingredient of which is a hydrocarbon polymer. For example, the addition of either the crystalline 1,2-dihydronaphthalene dimer or the crude mixture of liquid and solid dimer to the solid polymer of 1,4-dihydronaphthalene, which is described in U. S. Patent 2,055,708 and the pending patent application Serial No. 736,960, filed July 25, 1934, now issued as U. S. Patent 2,108,213, serves to soften and plasticize the resulting composition. In making such composition the crystalline dimer may be heated with the other hydrocarbon polymer at a temperature above the melting point of the latter, whereby the crystalline material dissolves in the other polymer. On cooling, the crystalline dimer does not tend to crystallize or otherwise separate, provided that it is not added in too large quantities. The various methods of incorporating the crystalline dimer in various plastic compositions will be apparent to those skilled in the preparation of such compositions. The crystalline material also is useful as an intermediate in various chemical syntheses where a pure hydrocarbon is desired. In view of its crystalline nature it may be prepared in a highly purified state which is advantageous in using it as a raw material in chemical syntheses. For example, it may be nitrated, sulfonated, etc., to form intermediates useful in various organic preparations.

I claim:
1. The process for polymerizing 1,2-dihydronaphthalene which comprises reacting it with sulfuric acid of 75 to 85% strength.
2. The process for polymerizing 1,2-dihydronaphthalene which comprises reacting it with sulfuric acid of about 80% strength.
3. The process for polymerizing 1,2-dihydronaphthalene which comprises reacting it with sulfuric acid of 75 to 85% strength at a temperature of 20 to 200° C.
4. The process for polymerizing 1,2-dihydronaphthalene which comprises reacting it with sulfuric acid of about 80% strength at a temperature of 20 to 60° C.
5. As a new composition of matter, a solid, crystalline dimer of 1,2-dihydronaphthalene, the melting point of which is 51–52° C. in the purified state and the boiling point of which is about 210–220° C. at a pressure of 1–5 mm. of mercury pressure.

JOSEPH FREDERIC WALKER.